Dec. 15, 1959 P. J. RIVERS 2,917,020
FLAT TIRE ALARM
Filed March 10, 1958 2 Sheets-Sheet 1

INVENTOR
PAUL J. RIVERS
By Frederick C. Browley
ATTY.

Dec. 15, 1959   P. J. RIVERS   2,917,020
FLAT TIRE ALARM

Filed March 10, 1958   2 Sheets-Sheet 2

INVENTOR
PAUL J. RIVERS

By Frederick E. Bromley
ATTY.

United States Patent Office 2,917,020
Patented Dec. 15, 1959

2,917,020

FLAT TIRE ALARM

Paul J. Rivers, Toronto, Ontario, Canada

Application March 10, 1958, Serial No. 720,389

4 Claims. (Cl. 116—34)

My invention relates to improvements in alarms for indicating a deflated condition of an automobile tire. It is highly desirable to equip a motor car with a signalling device which will give a clear dependable warning of a low or flat condition of a tire on the vehicle, not only with a view point of safety, but also to preclude irrepairable damage to the tire.

An important object in my invention is to provide an alarm device of this kind which will warn the driver of the vehicle when a tire becomes soft or flat so that he will have an opportunity of remedying the condition before the tire is damaged or an accident ensues. According to my invention there is provided an alarm device which is adapted to be readily installed upon a motor vehicle with a purpose of signalling deflation of a tire and thus providing for safer and more carefree driving.

My invention provides an alarm device comprising a slender resilient rod supported on the running gear of the vehicle radially of a wheel and having an outer end terminated short of the tread face of the tire a distance to be lowered into contact with a road surface when the tire deflates, on making contact with the road surface a signal is set up in order to warn the driver of the deflation of the tire. In one form of the invention the scraping contact of the rod with the pavement is sufficient to set up an audible warning for the driver. The warning sound is enhanced by associating the resilient rod with a resonant device and by mounting the rod on the hub cap of a wheel, the hub cap itself serves as the resonant device and provides a highly desirable arrangement. Another way of carrying out the invention is to provide a resonant member such as the hub cap with a serrated part adapted to be traversed by the rod in making contact with a road surface. Still another way of carrying out the invention is to mount the resilient rod so that its movement will close an electric circuit of a signalling device mounted on the instrument panel of the motor car.

The invention is disclosed in the ensuing specification in the preferred and modified forms as illustrated in the accompanying drawings forming a part thereof. In the drawings, Fig. 1 depicts a preferred form of the invention in which the resilient arm is carried by the hub cap of a wheel;

Figure 1:
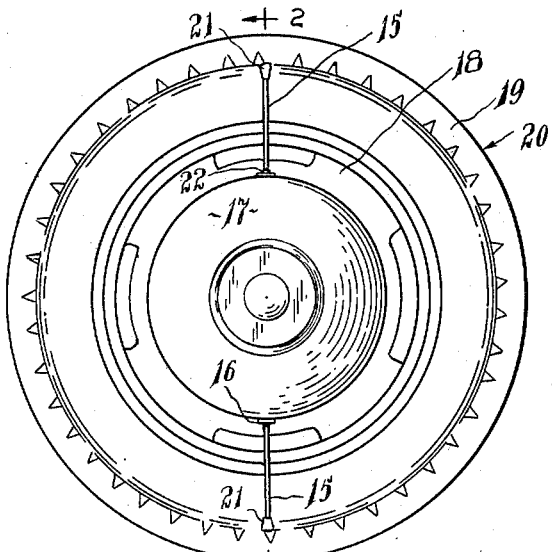
Figure 2:
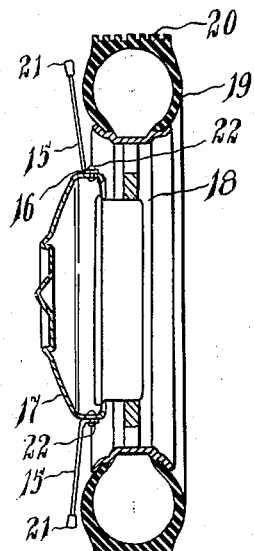
Fig. 2 is a cross section on line 22 of Figure 1, omitting unimportant details of the wheel structure.
Figure 3:
Fig. 3 is a detail of the slender resilient rod.

Referring at first to Figures 1, 2 and 3 of the drawings, there is depicted a selected embodiment of the invention in which the slender resilient rod indicated at 15, has an inner end 16 by which it is attached to a peripheral part of a standard hub cap 17 of a road wheel 18 equipped with an ordinary pneumatic tire 19 having a tread face 20. Rod 15 is desirably made of a length wire of a suitable guage and of a desirable resiliency whereby it may flex readily when coming into contact with a road surface such as a pavement. The rod is mounted to extend radially of the wheel alongside thereof and has an outer end 21 terminated short of the tread face 20 of the tire a distance sufficient to be lowered into contact with the road surface when the tire deflates. The engagement of the tip of the rod with the pavement is sufficient to induce vibration of the rod due to the accompanying scraping action accentuated by the flexing of the rod passing over the road surface in the rotation of the wheel. Thus the hub cap serves as a resonant device for signaling to the driver of the vehicle the deflation of the tire. It will be understood that the length of the rod is such that contact with the road surface will only be made when for any reason the tire become unduly soft or deflated. The rod is shown as secured to the rim portion of the hub cap as by means of a rivet 22, for which purpose the inner end or base portion of the rod is supplied with an eye 23, Figure 3. It will be understood, however, that other means of attaching the rod will suggest themselves to those skilled in the art.

Figures 4, 5:
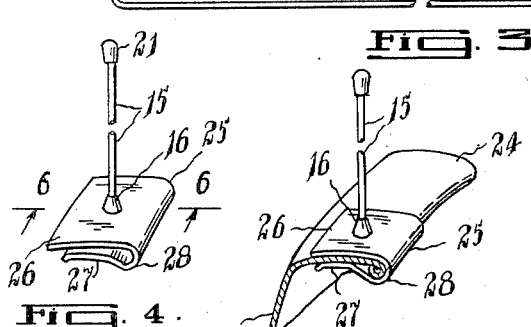
Fig. 4 is a view in perspective of a detachable form of the resilient rod for clipping on the hub cap.
Fig. 5 is a further perspective view of this modification and showing it applied to the hub cap.
Figure 6:
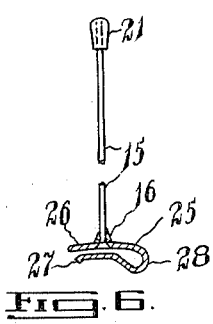
Fig. 6 is a cross section on line 66 of Figure 4.

It is highly desirable to provide for detachable connection of the rod to the hub cap in order that it may be applied to existing hub caps as an accessory. One way of making such a detachable connection is to provide the inner end or base of the rod with a clip as indicated in Figures 4, 5 and 6, which may be sprung onto the rim portion 24 of the hub cap. The clip indicated as a whole by the reference numeral 25 is a spring metal member of flat stock having a general U-shaped configuration. The clip has an outer flat leg 26, and an inner flat leg 27 merging with an enlarged bight 28 by which it is fitted over the beaded rim of the hub cap with the bight engaged over the bead and with the outer and inner legs tensioned against opposite sides of the rim portion 24. The inner end of the rod is rigidly secured to the outer face of the leg 26 to extend therefrom. According to this arrangement the alarm device may be sold as an accessory and applied to the hub cap of a wheel. It will of course be understood that each wheel of a vehicle will be equipped with such an alarm device and desirably two such rods will be used in diametrically opposite relation on the hub cap as illustrated.

Figure 7:
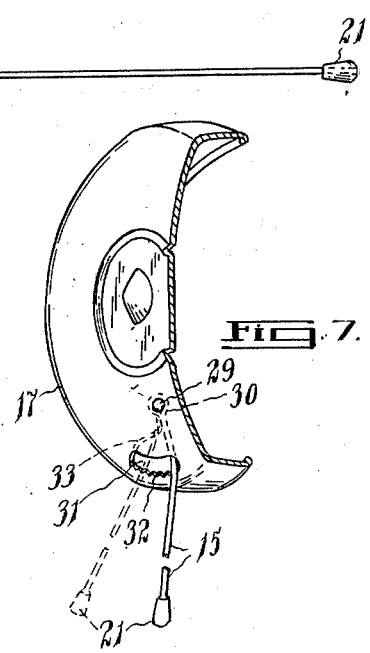
Fig. 7 is another variant form of the invention in which the resilient rod engages serrations provided on the hub cap.
Figure 8:
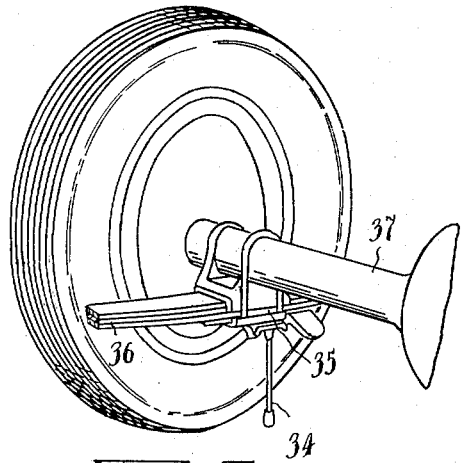
Fig. 8 is a further modification in which the resilient rod depends from a rear suspension spring of the running gear.

In the modification of the invention indicated in Figure 7, there is shown an arrangement in which the rod 15 has its inner end 29 pivoted at 30 to the side wall of the hub cap 17. The rod extends through an aperture providing a slot 31 in said side wall which has an edge portion supplied with serrations 32. The rod is tensioned against the serrations and is pressed to one end of the slot by means of a spring 33 so that when it is lowered into contact with a pavement the dragging effect of the engagement will cause the rod to move to the opposite end of the slot and thus set up a forcible signal due to the rod riding over the serrations. The spring 33 returns the rod as it is disengaged from contact with the road surface and the operation is repeated each time contact is made with the road surface. In a further variant form of the invention depicted in Figure 8 the rod denoted at 34 is mounted to rigidly depend from the bracket 35 of the spring suspension 36 of the running gear. Accordingly the alarm indicating rod does not rotate with the wheel but is fixed relative to the rear axle 37 of the running gear. This modification may be used on trucks as well as passenger cars. A similar mounting may be made for the front axle of the running gear. The rod 34 will extend downwardly alongside of a wheel and operate by contact with a road surface in deflation of the tire. The base end of the rod will be firmly secured by bracket 35 as by an attachment plate or other approved means.

Figure 9:
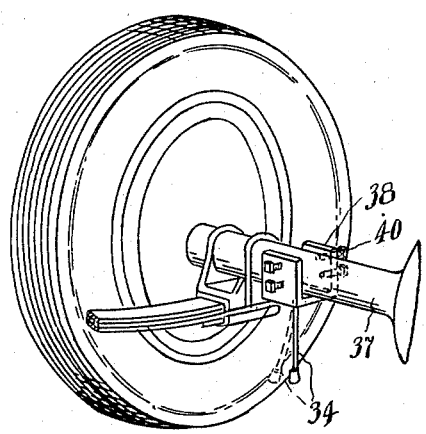
Fig. 9 is still another variant form of the invention in which a bracket carries the resilient rod and is detachably secured to the rear axle of the running gear as by the provision of screws.
Figure 11:
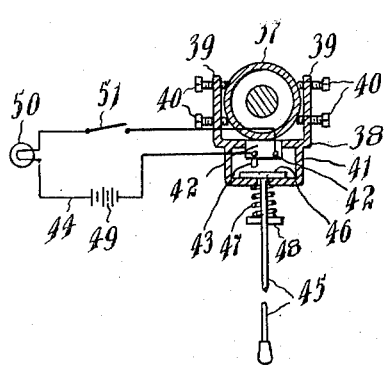
Fig. 11 shows a still further modification in which the resilient rod serves to close a switch of an electric signal.
Figure 10:
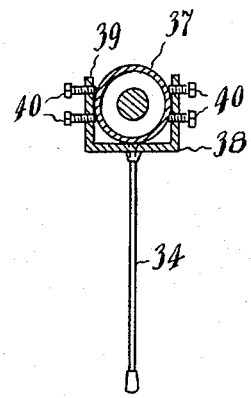
Fig. 10 is a sectionized view of this modification.
Figure 12:
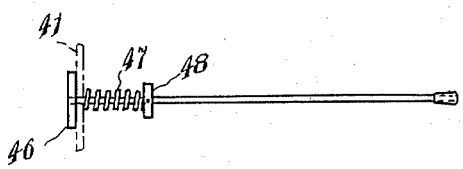
Fig. 12 is a detail of the resilient rod of this modification showing the spring by which it is retained in normal condition.

Now turning to the modification depicted in Figures 9, 10 and 11 there is shown an attachment bracket 38 for the rod 34 in order to apply it to a non-rotatable part of the running gear of the vehicle such as the rear axle housing 37. In this arrangement the bracket 38 is a U-shaped member to which the inner end of the rod 34 is permanently attached. The legs 39 of the U-bracket are supplied with screws 40 for tightening against the rear axle housing 37 to firmly secure the bracket in place. This arrangement need not be further dealt with in view of the preceding description.

Figure 11 incorporates an additional modification in the form of an electric signaling device. In this arrangement the bracket 38 is supplied with an integrated housing 41 containing a conventional electric switch 42 having a depressible plunger 43 for closing an electric circuit indicated at 44. The switch may be an ordinary micro switch well known in the art. The slender resilient rod indicated at 45 depends from the housing 41 and is mounted to slide inwardly thereof. This inner end is fixed to a plate 46 which is adapted to make contact with the plunger of the switch to depress the same when the rod is caused to move inwardly when lowered into contact with the pavement. A compression spring encircles the rod as indicated at 47 and has its inner end seated against the housing 41 and its other end seated against a collar 48. The spring operates to hold the rod in its outer position with the plate 46 in abutment with the housing clear of the switch plunger. Accordingly depression of the rod relative to the switch effectively operates the plunger. The circuit 44 includes a source of energy indicated at 49 and it will be understood that the electrical power may be derived from the ignition system of the motor vehicle. The electric circuit will extend to the instrument panel of the vehicle and may incorporate a visual signal such as the lamp 50. A master switch is indicated at 51. The operation of this arrangement will be clearly understood by those skilled in the art.

On the preceding description it will be manifest that my invention provides an inexpensive practical signaling device of the kind described and that such changes and modifications in the construction and arrangement may be resorted to as coming within the scope of the appended claims.

What I claim is:

1. A flat tire alarm for use with a wheel of the running gear of an automobile, said alarm comprising a metallic hub cap mounted on said wheel and presenting a resonant member, a slender resilient rod having an inner end rigid with said hub cap, said slender resilient rod disposed radially of said wheel and alongside thereof with an outer end terminated short of the tread face of the tire a distance sufficient to be lowered into contact with a road surface when the tire deflates.

2. A flat tire alarm as defined in claim 1, in which said slender resilient rod is detachably secured to the peripheral portion of said hub cap.

3. A flat tire alarm as defined in claim 1, in which said slender resilient rod is secured to the peripheral portion of said hub cap by means of a spring clip.

4. A flat tire alarm for use with a wheel of the running gear of an automobile, said alarm comprising a pressed metal hub cap on said wheel having a beaded rim, a spring clip of a U-shaped configuration having an outer flat leg and an inner flat leg merging with an enlarged bight, said spring clip fitted on the beaded rim of said hub cap with the said bight engaged over the bead and with the said outer and inner legs tensioned against opposite sides of said rim, a slender resilient rod having an inner end rigid with the outer leg of said spring clip, said slender resilient rod disposed radially of said wheel and alongside thereof with an outer end terminated short of the tread face of the tire a distance sufficient to be lowered into contact with a road surface when the tire deflates.

References Cited in the file of this patent
UNITED STATES PATENTS
2,741,673    Metcalf _____ Apr. 10, 1956